United States Patent Office 2,899,437
Patented Aug. 11, 1959

2,899,437

PYRIDYLETHYLATED SALICYLAMIDES

Seymour L. Shapiro, Hastings on Hudson, Louis Freedman, Bronxville, and Ira M. Rose, Yonkers, N.Y., assignors to U.S. Vitamin & Pharmaceutical Corporation, a corporation of Delaware No Drawing. Application January 17, 1958
Serial No. 709,461

6 Claims. (Cl. 260—295)

This invention relates to a new class of salicylamide derivatives, and more particularly is concerned with N-pyridylethylated salicylamides.

Specifically, the compounds of this invention have the following formula:

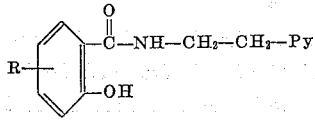

where R is alkyl, aryl, hydroxy, halogen, alkoxy and is substituted in one of the free positions of the benzene ring, and Py is 2-pyridyl, alkyl substituted 2-pyridyl, and 4-pyridyl. The —$CH_2$—$CH_2$— unit linking the pyridine ring with the amido nitrogen results in the compounds being N-pyridylethylsalicylamides.

The salicylamide group has been of considerable interest in the pharmaceutical field and wide utility as analgesics, fungicides, and anesthetics has been reported for N-alkylamides, N-arylamides, and N-dialkylaminoalkyl-amides of salicylic acids. By virtue of the novel N-pyridylethyl grouping, the new compounds of this invention encompass within a single substituent, alkyl, aryl, and aminoalkyl functions. The compounds of this invention accordingly have broad pharmacologic utility.

Due to the pyridine nitrogen, the compounds are bases and the invention contemplates the preparation of the acid addition salts of these bases by known methods. Moreover, reaction with the lower alkyl halides of the type $R^1X$ yields the pyridinium salts of the following formula:

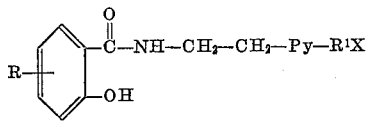

wherein $R^1$ is a lower alkyl group, and X is a halide ion, or p-toluenesulfonic acid anion and the like.

The pyridylethylsalicylamides are conveniently prepared by the alkaline hydrolysis of pyridylethylated 1,3-benzoxazine-2,4-diones disclosed in our publication, J. Am. Chem. Soc., 79, 2811 (1957).

The synthesis is represented by the equation:

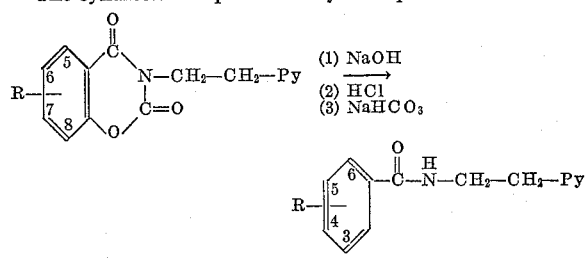

The reaction with the sodium hydroxide hydrolyzes and converts the benzoxazine-2,4-dione to the sodium salt of the N-pyridylethylsalicylamide. The acid then converts the sodium salt to the free phenolic derivative but the compound remains solubilized due to the formation of the acid salt at the pyridine nitrogen. Addition of sodium bicarbonate neutralizes the acid and precipitates the relatively water-insoluble N-pyridylethylsalicylamide.

Representative compounds have utility manifested as central nervous system depression, ganglionic blockade and anti-inflammatory response.

In addition to pharmaceutical applications, the accessibility of the reactive hydroxyl group ortho to the carbamido substituent, makes the compounds useful as chemical intermediates.

Thus, the hydroxyl group can be esterified with acid chlorides to yield, as for example with acetyl chloride, N-pyridylethylethyl acetylsalicylamides. Reaction of this hydroxyl group with isocyanates and isothiocyanates can afford the corresponding carbamates and thiocarbamates.

The following example is presented to illustrate this invention without, however, limiting the same thereto.

EXAMPLE I

A suspension of 0.005 mole of the N-pyridylethyl-1,3-benzoxazine-2,4-dione in 50 ml. of sodium hydroxide is stirred for 2–48 hours until solution is complete. The compounds of higher molecular weight are desirably solubilized with methanol and then added slowly to the sodium hydroxide solution. The reaction mixture is acidified with dilute hydrochloric acid, filtered, and the filtrate treated with excess sodium bicarbonate, yielding the N-pyridylethylsalicylamide which is recrystallized.

The purified N-pyridylethylsalicylamide dissolved in an organic solvent such as ethyl acetate, ethanol, dimethformamide and the like, and treated with methyl iodide yields the corresponding N-methylpyridinium iodide, the quaternary ammonium salt.

The compounds so prepared have been tabulated and characterized in Table I.

Table I

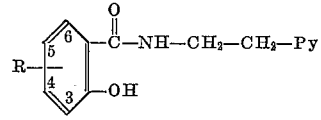

Py=X=2-pyridyl
Py=Y=2-pyridyl-5-ethyl
Py=Z=4-pyridyl

| R | X, Y or Z | Yield, Percent [a] | M.P., °C. |
|---|---|---|---|
| H | X | 43 | 114–115 |
| H | Y | 49 | 107–108 |
| H | Z | 53 | 105–106 |
| 5-Cl | X | 87 | 139 |
| 5-Cl | Y | 81 | 131 |
| 5-Cl | Z | 70 | 154–155 |
| $CH_3I$ [f] | | | 196–201 |
| 5-Br | X | 51 | 143 |
| 5-Br | Y | 67 | 131 |
| $CH_3I$ [f] | | | 198–201 |
| 3-$CH_3$ | X | [e] 73 | 97 |
| $CH_3I$ [f] | | | 188 |
| 3-$CH_3$ | Y | [c] 68 | 106 |
| $CH_3I$ [f] | | | 198–200 |
| 3-$CH_3$ | Z | 65 | 152–153 |
| 3-$C_6H_5$ | X | 63 | 140 |
| 3-$C_6H_5$ | Y | 58 | 113–114 |
| 3-$C_6H_5$ | Z | 66 | 180–182 |
| 5-$C_6H_5$ | Y | 70 | 147–148 |
| 5-$C_6H_5$ | Z | 66 | 127–128 |
| 4-OH | X | [d] 60 | 209–210 |
| 4-OH | Y | ([e]) | 172–173 |
| 4-OH | Z | [b] 71 | 275–276 |
| 5-OH | X | [d] 53 | 202–205 |
| 5-OH | Y | 55 | 160–161 |
| 5-OH | Z | [d] 58 | 238–242 |

[a] All compounds were recrystallized from ethyl acetate-hexane unless otherwise indicated.
[b] Ethanol.
[c] Hexane.
[d] Ethanol-water.
[e] Ethyl acetate.
[f] Indicates the methiodide of compound immediately above in the table.

This application is a continuation-in-part of our copending application Serial No. 593,059, filed June 22, 1956, now United States Patent No. 2,835,668.

Various modifications may be made in the method of the present invention without departing from the spirit or scope thereof, and it is to be understood that we limit ourselves only as defined in the appended claims.

Having described our invention, what we claim as new and desire to secure by Letters Patent is:

1. As a composition of matter, a pyridylethylated salicylamide having the formula:

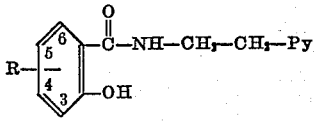

wherein Py is a member of the group consisting of 2-pyridyl, alkyl-substituted-2-pyridyl, said alkyl having 1-2 carbon atoms, and 4-pyridyl, and R is a member of the group consisting of hydrogen, chlorine, bromine, hydroxyl, lower alkyl, and phenyl, and non-toxic mineral acid addition and methyl quaternary ammonium salts thereof.

2. The compound

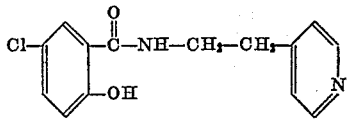

3. The compound

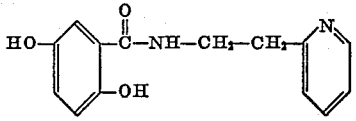

4. The compound

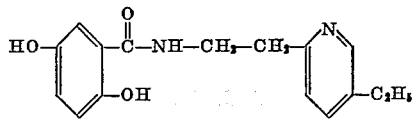

5. The compound

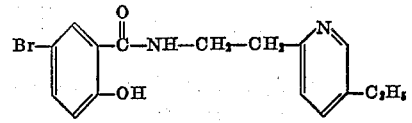

6. The compound

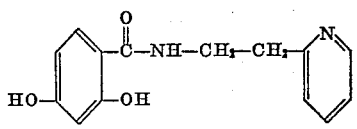

References Cited in the file of this patent

UNITED STATES PATENTS 2,401,522   Stoll et al. _____ June 4, 1946

OTHER REFERENCES

Feist et al.: Chem. Abst., vol. 30, p. 1377[2] (1936).